United States Patent Office 3,375,176
Patented Mar. 26, 1968

3,375,176
CHEMILUMINESCENT FORMULATION
Lee E. Humiston, China Lake, Calif., assignor to the United States of America as represented by the Secretary of the Navy
No Drawing. Filed Sept. 23, 1964, Ser. No. 399,429
2 Claims. (Cl. 252—188.3)

The invention described herein may be manufactured and used by or for the Government of the United States of America for governmental purposes without the payment of any royalties thereon or therefor.

The present invention relates to novel waxy chemiluminescent formulations.

Various chemiluminescent compounds such as the peraminoethylene compounds are known. However, their utility and the life of their emission of light or "glow" is dependent upon a compatible carrier. The present invention is for a new chemiluminescent formulation which is wax-like and has improved physical properties.

It is therefore an object of this invention to provide a chemiluminescent formulation for use as a night time marking material.

Another object is to provide a chemiluminescent formulation which has prolonged glow and durability.

Yet another object is to produce a material which can be successfully used as a search and rescue aid.

A further object is to provide an illuminating material with great light output at relatively low cost.

Other objects and many of the attendant advantages of this invention will be readily appreciated as the same become better understood by reference to the following detailed description.

The present chemiluminescent formulation comprises at least one non-aromatic hydrocarbon wax, an alkylsiloxane, and a peraminoethylene.

The active chemiluminescent ingredient of this formulation is a peraminoethylene of the formula

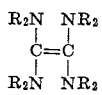

in which the R's which can be alike or different are straight or branched chain alkyl or cycloalkyl hydrocarbon radicals of from 1–10 carbons each which can be joined pairwise on one nitrogen to form 3–5 membered monoazo heterocycles and on two nitrogens to form 3–7 membered diaza heterocycles. The preferred member of the series of peraminoethylenes, namely, tetrakis(dimethylamino)ethylene (TMAE), was first prepared by the reaction of dimethylamine and chlorotrifluoroethylene and reported by Pruett et al. in the Journal of American Chemical Society, 72, 3646 (1950).

The body material of the formulation which comprises at least one non-aromatic hydrocarbon wax includes paraffin, microcrystalline waxes, amorphous waxes such as mineral oil or petrolatum and blends thereof. The microcrystalline wax improves the marking ability of the formulation over the formulation containing only household paraffin. The mineral oil makes the formulation easier to mix into a smooth blend.

The alkylsiloxanes used were commercially available oils and greases and were found to improve the light intensity and time output of the formulation. These silicones are compounds of silicon and oxygen and usually also contain carbon and hydrogen in their molecules which have the structural unit $(R_2SiO)_n$ in which R is usually $CH_3$, but may be H, $C_2H_5$, $C_6H_5$ or more complex substituents. The properties of these siloxanes vary depending on the length of the chain, the nature of the R groups and the extent of crosslinking. Dimethylsilicone oil dispersed in lithium stearate and procured from Dow-Corning under the name DC–11, and phenylmethylsilicone also a Dow-Corning silicone oil were used in the preparation of these formulations.

In processing the formulation the hydrocarbon wax was melted, admixed with the peraminoethylene and siloxane in an inert atmosphere. The relatively clear free flowing formulation was then poured or cast into preforms or molds and cooled until solid. Several sticks of this material were first formed and proved a simple means of marking objects in the dark. When the waxy formulation was rubbed against a surface the chemiluminescent material, namely, tetrakis(dimethylamino)ethylene, thus exposed to air emitted light or "glowed."

The proportions of the ingredients comprising this formulation are variable. The following examples are illustrative of the formulation made in accordance with the present invention and are not to be considered as limiting the scope thereof.

Example I

| Ingredients: | Percent by weight |
|---|---|
| Paraffin (household) | 70 |
| Mineral oil (Nujol) | 10 |
| Dimethylsilicone | 5 |
| Tetrakis(dimethylamino)ethylene | 15 |

The paraffin was first melted then the mineral oil and dimethyl silicone grease were blended in until a smooth mixture resulted. The chemiluminescent material tetrakis(dimethylamino)ethylene which is a liquid, was thoroughly stirred into the mixture and the resulting formulation which is a clear liquid was poured into preforms or molds and let stand until solid. The mixing and cooling took place in an inert atmosphere. Upon exposure to air the material luminesced well and was observed to last about eight hours. However, when used as a marker it was soft and crumbled.

Example II

| Ingredients: | Percent by weight |
|---|---|
| Paraffin wax (household) | 35 |
| Microcrystalline wax | 35 |
| Mineral oil (Nujol) | 5 |
| Dimethylsilicone | 2 |
| Tetrakis(dimethylamino)ethylene | 23 |

The above ingredients were blended together in an inert atmosphere as described in Example I. The sticks formed from this formulation luminesced well and were harder. When used for marking they left a fairly uniform layer. This was attributed to the addition of the microcrystalline wax which also improved the temperature stability of this material.

Example III

| Ingredients: | Percent by weight |
|---|---|
| Paraffin | 15–55 |
| Microcrystalline wax | 15–55 |
| Mineral oil | 5–25 |
| Methylphenylsilicone | 1–20 |
| Tetrakis(dimethylamino)ethylene | 20–30 |

Variations of the above ingredients were mixed as in Example I and cast into sticks. All luminesced and left a fair layer when tested for marking objects.

Obviously many modifications and variations of the present invention are possible in the light of the above teachings. It is therefore to be understood that within the scope of the appended claims the invention may be practiced otherwise than as specifically described.

What is claimed is:

1. A chemiluminescent formulation comprising the following

| Ingredients: | Percent by weight |
| --- | --- |
| Paraffin | 15–55 |
| Microcrystalline wax | 15–55 |
| Mineral oil | 5–25 |
| Methylphenylsilicone | 1–20 |
| Tetrakis(dimethylamino)ethylene | 20–30 |

2. A chemiluminescent formulation comprising the following

| Ingredients: | Percent by weight |
| --- | --- |
| Paraffin wax | 35 |
| Microcrystalline wax | 35 |
| Mineral oil | 5 |
| Dimethylsilicone | 2 |
| Tetrakis(dimethylamino)ethylene | 23 |

References Cited

UNITED STATES PATENTS 3,239,406  3/1966  Coffman et al. ___ 252—301.2 X
3,257,330  6/1966  Burzynski et al. ____ 252—301.2

LEON D. ROSDOL, *Primary Examiner.*

L. DEWAYNE RUTLEDGE, *Examiner.*

S. J. LECHERT, Jr., J. D. WELSH, *Assistant Examiners.*